United States Patent [19]

Crowley

[11] 4,114,369

[45] Sep. 19, 1978

[54] COOK-OFF COATING

[75] Inventor: Donald P. Crowley, Lowell, Mass.

[73] Assignee: The United States of America as represented by the Secretary of the Navy, Washington, D.C.

[21] Appl. No.: 794,165

[22] Filed: May 5, 1977

[51] Int. Cl.² .............................................. F02K 1/00
[52] U.S. Cl. ................................... 60/200 A; 102/105;
    252/62; 428/213; 428/251; 428/324; 428/920
[58] Field of Search .............. 428/920, 921, 324, 251,
    428/35, 36, 213, 215; 60/200 A; 102/105;
    252/117 A, 62, 8.1; 106/15 FP; 156/92, 203,
    215, 304

[56] References Cited

U.S. PATENT DOCUMENTS

| | | | |
|---|---|---|---|
| 1,329,463 | 2/1920 | Maranville | 156/92 |
| 3,182,469 | 5/1965 | Kirchner | 60/200 A |
| 3,421,970 | 1/1969 | Daly et al. | 260/37 N |
| 3,520,845 | 7/1970 | McKeown et al. | 428/324 |
| 3,525,708 | 8/1975 | Clark et al. | 106/15 FP |
| 3,530,024 | 9/1970 | Wittenstein | 156/30 X |
| 3,535,130 | 10/1970 | Webb et al. | 428/921 |
| 3,663,464 | 5/1972 | Sawko | 106/15 FP |
| 3,726,829 | 4/1973 | Sayles | 260/27 BB |
| 4,001,126 | 1/1977 | Marion et al. | 102/105 |
| 4,010,690 | 3/1977 | Cocozella et al. | 102/105 |
| 4,041,872 | 8/1977 | McCoun et al. | 102/105 |

Primary Examiner—Douglas J. Drummond
Assistant Examiner—Michael W. Ball
Attorney, Agent, or Firm—Richard S. Sciascia; Joseph M. St. Amand

[57] ABSTRACT

A flexible composite sheet coating for providing cook-off protection time for rocket motors, etc., comprising intumescent material in liquid form including mica flakes sprayed in sequence onto aluminum foil and glass cloth and bonded to the wall of a rocket structure.

23 Claims, 1 Drawing Figures

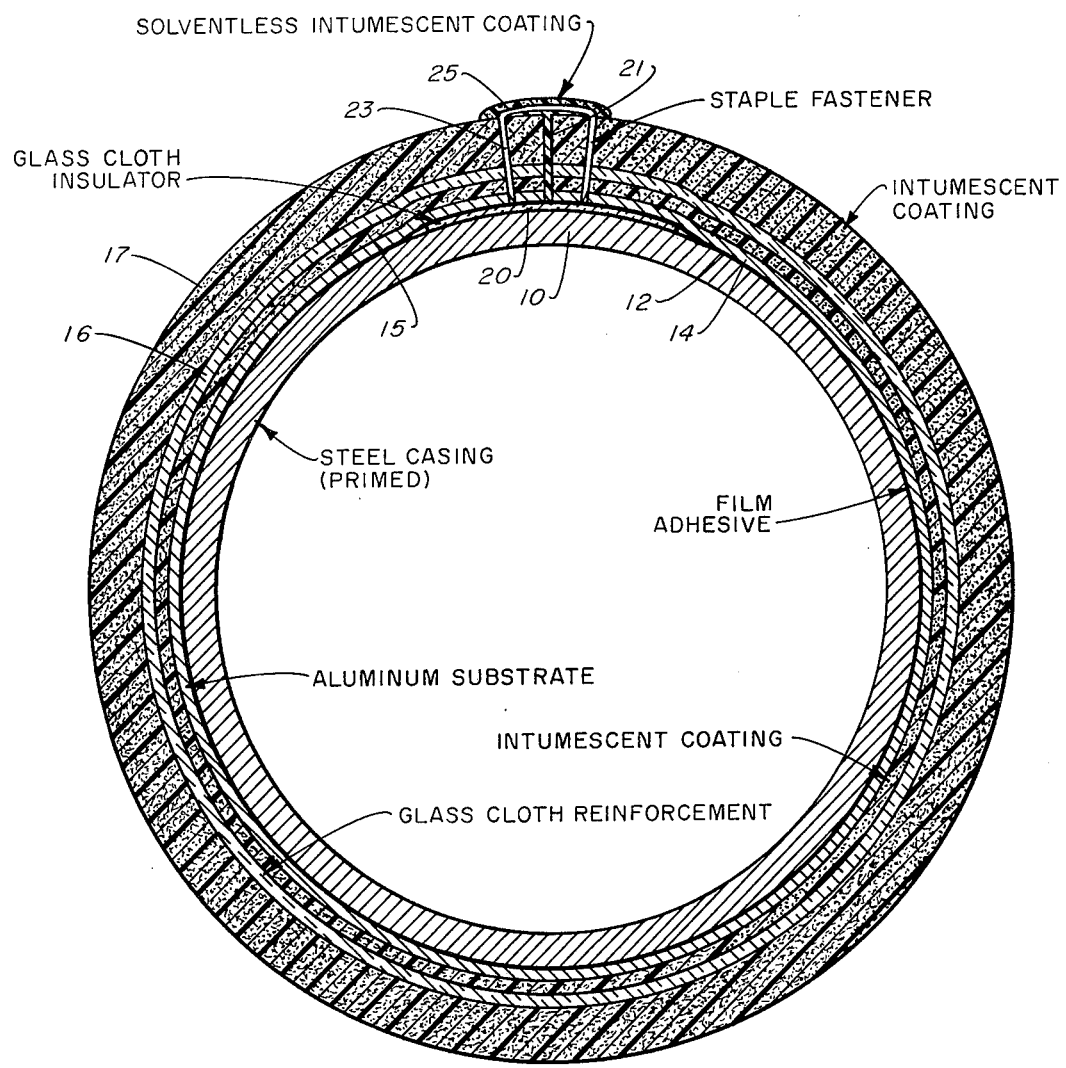

COOK-OFF COATING

BACKGROUND OF THE INVENTION

This invention relates to composite sheet coatings as thermal barriers and more particularly to providing rocket motors with an ablative insulating covering or cook-off coating which inhibits heat transfer for safety purposes.

Previous attempts to provide cook-off coatings for rocket motors has resulted in coatings that had insufficient strength or insulating properties to provide the necessary protection time and margin of safety against fire due to outside sources or burning propellant. Intumescent chemicals have been used before as thermal barriers between layers of a propellant for preventing reignition of a quenchable grain that has been quenched to extinguish the burning thereof. Also, inorganic flakes of mica or glass have been used in high temperature resistant, high voltage insulating sheet material. Nevertheless, none of the prior art insulators have provided a suitable cook-off coating for providing safety and protection of rocket motors or similar devices during fire hazards.

It is an object of the present invention to provide an externally applied, ablative thermal barrier coating in a flexible sheet-form.

It is another object of the invention to provide a cook-off coating for rocket motors.

Still another object of the invention is to provide a novel composite coating which serves as a safety thermal barrier for rocket motors.

A further object of the invention is to provide a method for wrapping and joining composite thermal insulating materials to rocket motors to form protective thermal barriers thereon.

Further objects, advantages and novel features of the invention will become apparent from the following detailed description of the invention when considered in conjunction with the accompanying drawing.

BRIEF DESCRIPTION OF THE DRAWING

The FIGURE of drawing is a cross-sectional view on an embodiment of the invention showing a rocket motor casing with composite flexible sheet and joint configuration for the cook-off coating.

DETAILED DESCRIPTION OF THE PREFERRED EMBODIMENT

The invention is for an externally applied coating in a flexible sheet-form that provides cook-off protection time for missiles, rocket motors and for similar purposes. A flexible sheet comprised of intumescent coatings based on the ammonium salt of 4-nitroanaline-2 sulfonic acid in an epoxy polysulfide binder and loaded with mica flakes (see table I) is made as follows:

While in liquid form, the intumescent coating formulation is sprayed in sequence onto aluminum foil (e.g., 2 mil thickness) and glass cloth (e.g., Burlington 112 glass cloth), building up to a thickness of approximately 60 mils.

TABLE I
INTUMESCENT COATING FORMULATION
Values listed are concentrations in parts by weight.

| Ingredient | Mod 11 |
| --- | --- |
| Part A | |
| Polysulfide polymer (LP-3) | 24.4 |
| Ammonium salt of 4 nitro- | |
| analine-2 sulfonic acid | 36.6 |
| Methyl ethyl ketone | 17.8 |
| Mica flake (T-40 B, Hayde Mica Co.) | 7.8 |
| Part B | |
| Epoxy resin, liquid | 12.2 |
| Toluene | 4.0 |
| Part C | |
| Tri(dimethylamino methyl) phenol | 2.5 |
| Toluene | 2.5 |

The flexible composite sheet material is then wrapped onto a cleaned and primed rocket motor section, as shown in the FIGURE of drawing, using a combination of adhesive bonding and stapling of the butt joint formed by the wrap. As can be seen in the drawing, a primed steel motor casing 10 has an adhesive film 12 (such as Permacel PO8 contact film) thereon for bonding to the aluminum substrate 14 of the composite flexible sheet that forms the protective cook-off coating. The composite sheet comprises the aluminum foil substrate (e.g., T-O aluminum alloy) 14, a sublayer of intumescent coating material 15, a reinforcement layer of glass cloth 16, and a top layer of intumescent coating material 17.

A sheet of composite material having an aluminum substrate 2 mils in thickness, a sublayer of intumescent material 8 mils in thickness covered with a glass cloth reinforcement and a 52 mil thick top layer of intumescent material (formulation, Table I) for an overall thickness of approximately 60 mils will provide a coating having a five-minute cook-off protection time with a wide margin of safety.

A glass cloth insulator strip 20 may be provided beneath the butt joint 21 formed where the edges of the composite sheet wrap meet. A plurality of staple fasteners 23 or similar means can be used along the butt joint to reinforce the joint. A solventless intumescent coating is then applied along and in the joint at 25 to seal and bond the joint together, as can be seen in the drawing.

A typical procedure for application of the cook-off coating to a cylindrical rocket motor casing is as follows:

a. solvent clean the exterior surface of rocket casing 10;

b. grit blast the casing surface (with 60–80 $Al_2O_3$ grit, for example);

c. apply a primer to the metal casing and allow to cure, at room temperature for 72 hours, for example;

d. apply adhesive film 12 to the casing 10 by draping a contact film over the cylinder; trim and paddle, leaving release paper on the exterior surface of the contact film on the cylinder;

e. lay a flexible composite sheet comprised of aluminum substrate 14, intumescent/mica coating 15, glass cloth 16, and intumescent top layer 17, on flat table with aluminum substrate side up;

f. align longitudinal axis of cylinder with edge of composite sheet;

g. roll cylindrical motor casing over composite sheet and crease completely;

h. open composite sheet and trim;

i. remove all release paper except a band approximately 1 inch wide on either side of joint area;

j. align edge of composite sheet with center line of release paper along longitudinal axis of cylindrical casing;

k. roll and adhere casing to composite sheet;

l. apply a strip 20 of contact film backed glass cloth longitudinally to cylinder at proposed joint location;

m. lift composite sheet flaps (at areas where release paper has not yet been removed from adhesive contact film);

n. install staples along one edge of composite sheet at approximately 1 inch intervals;

o. remove release paper strip from contact film and press flaps against film to close composite sheet and form butt joint;

p. fold staples over to secure gap at joint;

q. apply trowlable intumescent coating in and over gap and staples.

Other suitable methods for applying the composite cook-off sheet to a device may be used, as desired. Any suitable adhesive 12 may be used to afix the composite coating to a structure.

The chemicals, along with the mica flakes, in the intumescent coating layers serve to inhibit heat transfer and to provide an insulating layer about the rocket motor casing. The intumescent layers, along with the aluminum foil substrate and glass cloth reinforcement layer, provide an improved flexible ablative protective coating for rocket motors and other devices which is resistant for a designed safety period of time against flame and high temperatures produced by the combustion of rocket propellants.

The mica filler is designed to control degree of intumescence, and glass cloth reinforcements are intended to strengthen and prevent fissuring of the intumescent char layer. The aluminum foil enhances thermal performance. An epoxy polyamine primer was used to prime the steel motor casing; other suitable primers can be used.

An automated doctor blade technique also may be used for applying the intumescent material to the glass cloth reinforcement. Doctor blading can provide a more controllable product in terms of coating thickness, surface smoothness, and minimum waste. Doctor blading requires modification in the intumescent material formulation by adjustment of the solvent fraction from that of Mod 11 in Table I for the spray process. The modified sheet material is completely solventless but is otherwise similar to the Mod 11 material and has somewhat higher tensile strength. A polyurethane topcoat may be used, if desired, to provide improved physical properties, moisture resistance and color requirements.

Automated machinery for producing continuous rolls of cook-off sheet material may use an automated knife-over-roller "doctor blade" process for applying the intumescent liquid to the reinforcement fabric and the aluminum foil backing, and followed by a forced cure in a tunnel oven. The rather high solvent ratios of the Mod 11 spray formulation of Table I are not appropriate to the doctor blade and forced cure process. The modifications detailed in Table II (Mod 11D through Mod 11F) were applied first by hand doctor blading to a 60 mil thickness onto plain aluminum foil, followed by a room temperature cure. These modifications provided a substantial range of liquid viscosity, solvent ratio, and resin to solids content.

TABLE II

LIQUID INTUMESCENT COATING FORMULATION MODIFICATIONS
Values listed are concentrations in parts by weight.

| Ingredient | Mod 11D | Mod 11E | Mod 11F |
|---|---|---|---|
| Part A |  |  |  |
| Polysulfide polymer (LP-3) | 27.5 | 29.3 | 29.3 |
| Ammonium salt of 4-nitro-analine-2 sulfonic acid | 36.6 | 36.6 | 36.6 |
| Mica flake (T-40 B, Hayde Mica Co.) | 7.8 | 7.8 | 7.8 |
| Methyl ethyl ketone | 10.0 | 10.0 | 0 |
| Part B |  |  |  |
| Liquid epoxy resin | 13.4 | 14.6 | 13.4 |
| Toluene | 4.0 | 4.0 | 0 |
| Part C |  |  |  |
| Tri(dimethylamino methyl) phenol | 2.5 | 2.5 | 1.3 |
| Toluene | 0 | 2.5 | 0 |

Initial production runs were made on automated doctor blade over roll-coater and tunnel oven equipment. The higher solvent ratio Mod 11 was too fluid and was also subject to blistering and excessive brittleness when exposed to accelerated cure in a tunnel oven. Mod 11E (reduced solvent fraction) processed well, but was less flexible and subject to blistering when forced-cured in an oven. A solvent-free system is required to eliminate blistering problems arising during forced cure.

Following vacuum mixing, the mixed liquid solventless formulation, designated Mod 11F from Table II, is applied to 2-mil aluminum foil which is fed through a blade over roll-coater apparatus. Subsequently the glass cloth is deposited and the sheet passed through an oven. On leaving the oven, the sheet is wound on a roll. A second pass is then made through the roll-coater, applying a final layer of intumescent material over the glass cloth, followed by a second pass through the oven for the final cure. The sheet wrap material is readily produced in continuous lengths and widths corresponding to the approximate circumferences of the motor cylinders.

The application technique for the solventless formulation sheet material is the same as the typical previous technique. The basic steps of which are as follows: (1) surface preparation and application of primer to the cylinder; (2) cutting the wrap material with the aid of a template; (3) application of a contact film or other suitable adhesive to the primed cylinder; (4) application of the glass cloth insulating strip at the longitudinal seam; (5) application of the wrap material to the adhesive on the cylinder; (6) stapling the joint at the longitudinal seam; (7) filling the joint seam with Mod 11F liquid; (8) room temperature curing of the joint; and, if desired, (9) application of one or more urethane topcoatings. The intumescent sheet-wrap material is porous and, for moisture protection, requires sealing. A polyurethane topcoat applied to a thickness of 2 to 3 mils in one coat may be used for this purpose, if desired. A second coat can be applied to further improve humidity resistance, if necessary.

Various suitable techniques for closing the edges of the wrapped sheet may be utilized to preclude the possibility of edge peeling, etc. Simple adhesive joints may be opened during fire exposure and a mechanical tie between the opposite ends of the wrapped sheet may be used as shown in the FIGURE of drawing to provide an effective joint. This configuration utilized metal staples with the wrap ends impaled on the staple legs and the joint filled and sealed with solventless intumescent material. A technique better adapted to production utilizes a gun to install staples from the outer surface of the wrap material to lock through the glass cloth. Different configurations or means for forming the joint and seal at 21 are also possible.

Thermal performance evaluation tests were made on cylinder specimens with fire conditions preset to:

Radiation source temperature: 1850° F.
Radiant heat flux: 13.7 Btu/ft.$^{2\text{-Sec.}}$
Convective heat flux: 2 Btu/ft.$^{2\text{-Sec.}}$ In tests of the formulations from Tables I and II, the overall performance was acceptable on the basis of the criteria observed during fire exposure to detect any char fissuring, joint failure, or debonding, and by post-test examination of the char structure and removal of the char to evaluate charring or debonding of the adhesive. All four variations of the intumescent material performed satisfactorily with a nominal 60-mil coating thickness. Specifically, no char failure, joint failure or debonding occurred. No evidence of any thermal deterioration of the adhesive zone was found as would be expected if an overheat condition of the cylindrical substrates was experienced. There was no significant variation in cook-off performance between either coating formulation.

Obviously many modifications and variations of the present invention are possible in light of the above teachings. It is therefore to be understood that within the scope of the appended claims the invention may be practiced otherwise than as specifically described.

What is claimed is:

1. An ablative and flexible high strength insulative cook-off coating composite-sheet for providing a heat transfer inhibiting barrier as protection against fire and high temperatures, comprising:
   a. a metal foil substrate having one surface thereof operable to be affixed to a device to be protected from excess heat;
   b. a first layer of intumescent composition material adjacent to and affixed to the other surface of said metal foil substrate;
   c. a glass cloth reinforcement layer having one side thereof affixed to the surface of said first layer of intumescent material;
   d. a second layer of intumescent material affixed to the other side of said glass cloth; said second layer of intumescent material being of greater thickness than said first layer;
   e. said glass cloth reinforcement layer being embedded between said first and second layers of intumescent material; said glass cloth reinforcement layer being operable to strengthen said flexible composite-sheet and prevent fissuring of the intumescent material layers upon charring of the intumescent material and prevent char failure of said composite-sheet due to flame and high temperatures produced by combustion of rocket propellants and the like;
   f. said composite layers of aluminum foil, intumescent composition material and glass cloth being flexible and providing an ablative insulating covering which inhibits heat transfer and provides insulation for safety purposes over a desired period of time; said period of time operable to be varied by varying the overall thickness of the composite-sheet, particularly the overall thickness of said first and second intumescent material layers.

2. A composite-sheet as in claim 1 wherein said metal foil is aluminum.

3. A composite-sheet as in claim 1 wherein said intumescent composition material includes mica flakes for controlling the degree of intumescence of said material.

4. A composite-sheet as in claim 3 wherein the concentration of said mica flakes to other ingredients in the intumescent composition comprise approximately 7.2 percent by weight.

5. A composite-sheet as in claim 1 wherein a 5-minute protection time with a wide margin of safety is provided against heat and fire from burning rocket propellant with a composite-sheet having an overall thickness of approximately 62 mils and individual layer thicknesses comprising: a metal foil substrate of approximately 2 mils thickness; a first intumescent layer of approximately 8 mils thickness; a second intumescent layer of approximately 52 mils thickness.

6. A composite-sheet as in claim 1 wherein a contact film adhesive layer is provided on the exterior surface of said metal foil substrate for ease in affixing the said flexible composite-sheet to a device to be protected.

7. A composite-sheet as in claim 1 wherein said intumescent material composition comprises in parts by weight concentrations:
Polysulfide polymer: 24.4
Ammonium salt of 4 nitroanaline-2 sulfonic acid: 36.6
Methyl ethyl ketone: 17.8
Mica flake: 7.8
Liquid epoxy resin: 12.2
Tri(dimethylamino methyl) phenol: 2.5
Toluene: 6.5

8. A composite-sheet as in claim 1 wherein at least one polyurethane topcoat is provided to said second layer of intumescent material to improve physical properties and increase the moisture resistance thereof.

9. A composite-sheet as in claim 1 wherein said intumescent material composition comprises in parts by weight concentrations:
Polysulfide polymer: 29.3
Ammonium salt of 4 nitroanaline-2 sulfonic acid: 36.6
Mica flake: 7.8
Liquid epoxy resin: 13.4
Tri(dimethylamino methyl) phenol: 1.3

10. A composite-sheet as in claim 1 wherein said intumescent material composition comprises:
   (a) 24.4 to 29.3 parts by weight polysulfide polymer;
   (b) approximately 36.6 parts by weight of ammonium salt of 4-nitroanaline-2 sulfonic acid;
   (c) approximately 7.8 parts by weight of mica flake;
   (d) 0 to 17.8 parts by weight methyl ethyl ketone;
   (e) 12.2 to 14.6 parts by weight liquid epoxy resin in 0 to 4 parts by weight toluene;
   (f) 1.3 to 2.5 parts by weight tri (dimethylamino methyl) phenol in 0 to 2.5 parts by weight toluene.

11. In a rocket motor casing, an ablative and flexible composite-sheet covering which provides a high thermal barrier cook-off coating as a protection against flame and high temperatures comprising:
   a. a metal foil substrate having one surface affixed by an adhesive layer to the exterior surface of said rocket motor casing;
   b. a first layer of intumescent composition material affixed to the other surface of said metal foil substrate;
   c. a glass cloth reinforcement layer having one side thereof affixed to said first layer of intumescent material;

d. a second layer of intumescent material affixed to the other side of said glass cloth reinforcement layer;

e. said glass cloth reinforcement layer being embedded between said first and second layers of intumescent material; said glass cloth reinforcement layer being operable to strengthen said flexible composite-sheet and prevent fissuring of the intumescent material layers upon charring of the intumescent material and prevent char failure of said composite-sheet due to flame and high temperature produced by combustion of rocket propellants and the like;

f. said composite-sheet covering of layers of aluminum foil, intumescent composition material and glass cloth providing a protective insulating covering which inhibits heat transfer and prevents thermal deterioration in the zone of said adhesive layer for safety purposes over a desired time period of exposure to flame or high temperatures; said time period operable to be varied by varying the overall thickness of said composite-sheet covering, particularly the overall thickness of said first and second intumescent material layers.

12. A device as in claim 11 wherein said flexible composite-sheet covering is wrapped about said rocket motor casing and two opposite edges of said composite-sheet covering when wrapped thereabout are abutted together and sealed with an intumescent composition material.

13. A device as in claim 12 wherein the joint formed by the abutted edges of said composite-sheet covering are joined by fastener means prior to sealing with said intumescent composition material to reinforce said joint to preclude edge peeling during charring of said intumescent layers.

14. A device as in claim 12 wherein a glass cloth insulator strip is provided beneath said abutted edges of said composite-sheet covering prior to sealing to further reinforce the joint formed by said abutted opposite edges of said flexible composite-sheet covering.

15. A device as in claim 11 wherein said metal foil is aluminum.

16. A device as in claim 11 wherein said intumescent composition material is loaded with mica flakes to control the degree of intumescence thereof.

17. A device as in claim 16 wherein the concentration of mica flakes to other ingredients in the intumescent composition comprise approximately 7.2 percent by weight.

18. A device as in claim 11 wherein a 5-minute protection time with a wide margin of safety is provided against heat and combustion from burning rocket propellant with a composite-sheet having an overall thickness of approximately 62 mils and individual layer thicknesses comprising: a metal foil substrate of approximately 2 mils thickness; a first intumescent layer of approximately 8 mils thickness; a second intumescent layer of approximately 52 mils thickness.

19. A device as in claim 11 wherein said intumescent material composition comprises in parts by weight concentrations:

Polysulfide polymer: 24.4
Ammonium salt of 4 nitroanaline-2 sulfonic acid: 36.6
Methyl ethyl ketone: 17.8
Mica flake: 7.8
Liquid epoxy resin: 12.2
Tri(dimethylamino methyl) phenol: 2.5
Toluene: 6.5

20. A device as in claim 11 wherein said intumescent material composition is based on the ammonium salt of 4-nitroanaline-2 sulfonic acid in an epoxy polysulfide binder and loaded with mica flakes.

21. A device as in claim 11 wherein at least one polyurethane topcoat is provided to said second layer of intumescent material to improve physical properties and increase the moisture resistance thereof.

22. A device as in claim 11 wherein said intumescent material composition comprises in parts by weight concentrations:

Polysulfide polymer: 29.3
Ammonium salt of 4 nitroanaline-2 sulfonic acid: 36.6
Mica flake: 7.8
Liquid epoxy resin: 13.4
Tri(dimethylamino methyl) phenol: 1.3.

23. A device as in claim 11 wherein said intumescent material composition comprises:

(a) 24.4 to 29.3 parts by weight polysulfide polymer;
(b) approximately 36.6 parts by weight of ammonium salt of 4-nitroanaline - 2 sulfonic acid;
(c) approximately 7.8 parts by weight of mica flake;
(d) 0 to 17.8 parts by weight methyl ethyl ketone;
(e) 12.2 and 14.6 parts by weight liquid epoxy resin in 0 to 4 parts by weight toluene;
(f) 1.3 to 2.5 parts by weight tri(dimethylamino methyl) phenol in 0 to 2.5 parts by weight toluene.

* * * * *